United States Patent [19]

Rasanen

[11] 4,304,095
[45] Dec. 8, 1981

[54] INTERNAL COMBUSTION STEAM POWER UNIT

[76] Inventor: Kaarlo E. Rasanen, 3592 Surf Pl., Oceanside, Calif. 92054

[21] Appl. No.: 190,438

[22] Filed: Sep. 24, 1980

[51] Int. Cl.³ .............................................. F02C 3/16
[52] U.S. Cl. ................................. 60/39.35; 60/39.55; 60/39.82 N
[58] Field of Search ............ 60/39.34, 39.35, 39.46 G, 60/39.55, 39.82 R, 39.82 S, 39.82 N

[56] References Cited

U.S. PATENT DOCUMENTS

| | | | |
|---|---|---|---|
| 1,315,906 | 9/1919 | Brockman | 60/39.34 |
| 2,424,610 | 7/1947 | Goddard | 60/39.35 |
| 2,509,359 | 5/1950 | Margolis | 60/39.34 |
| 2,701,950 | 2/1955 | Huber et al. | 60/39.82 N |
| 2,777,290 | 1/1957 | Bailey | 60/39.35 |
| 3,101,592 | 8/1963 | Robertson et al. | 60/39.46 G |

*Primary Examiner*—Louis J. Casaregola
*Attorney, Agent, or Firm*—Brown & Martin

[57] ABSTRACT

A high pressure internal combustion steam power unit employing gaseous hydrogen and oxygen as fuels and having water injected as a coolant and source of steam. A mounting frame securing the unit to either a fixed or mobile mount. The frame supports a power output shaft formed integrally with a cylindrically shaped combustion chamber. The combustion chamber and shaft rotate within the frame. A single bearing at the forward end of the frame supports the power output shaft and combustion chamber. Oxygen, hydrogen, and water are introduced into the interior of the combustion chamber through a non-rotating multiple nozzle passage which projects into the combustion chamber at its after end. Propulsion pods located on the periphery of the combustion chamber receive the combustion products and steam from the combustion chamber via internal passages. Nozzle slots in the propulsion pods release the steam to the atmosphere so as to cause rotation of the combustion chamber and the power output shaft.

8 Claims, 6 Drawing Figures

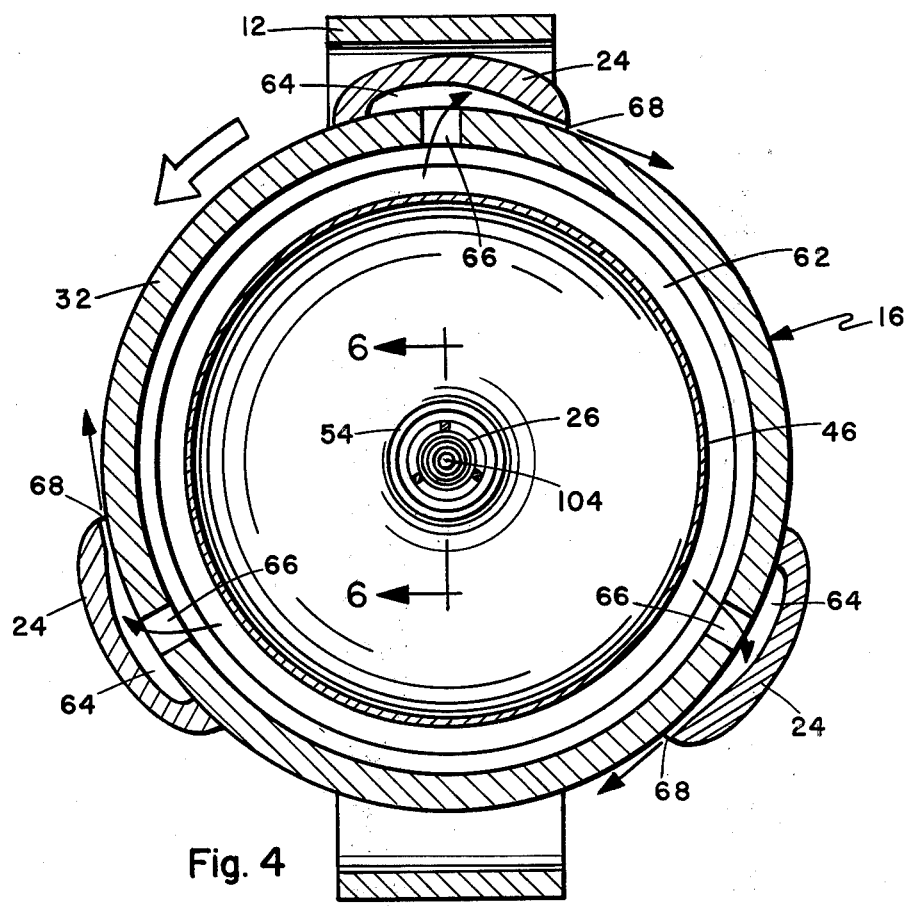
Fig. 4
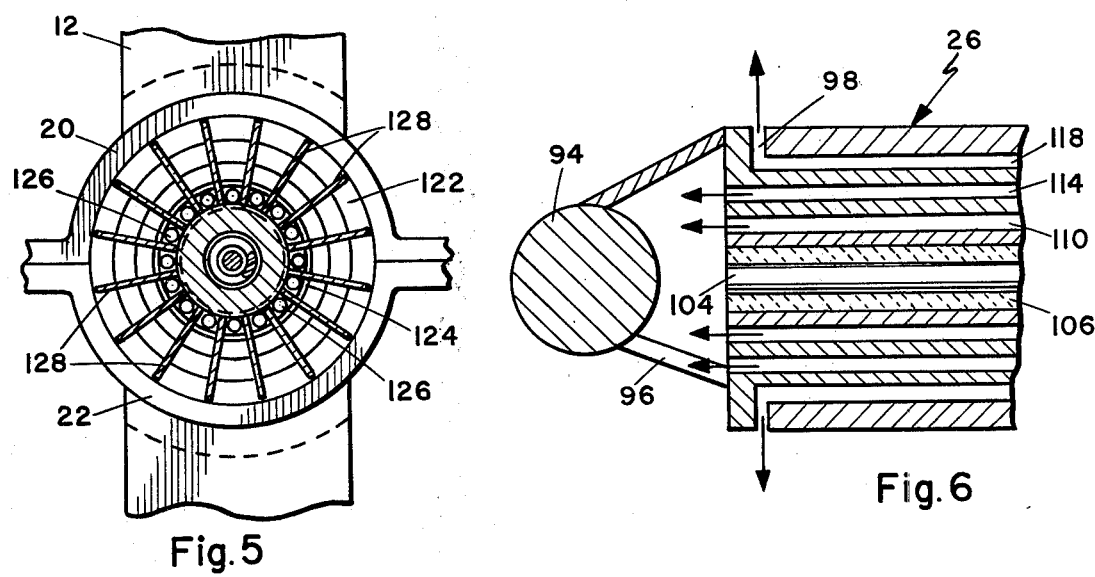
Fig. 5
Fig. 6

INTERNAL COMBUSTION STEAM POWER UNIT

BACKGROUND OF THE INVENTION

There is a continuing need for prime movers to supply rotational power for both mobile and stationary applications. Internal combustion and steam power plants are available for such purposes, but existing power plants have disadvantages which are becoming increasingly more important with the passage of time. Piston driven internal combustion engines and turbine designs conventionally employ petroleum products as fuels. Petroleum fuels are becoming scarce and more costly. Equally, important, however, are environmental considerations. The products of combustion of petroluem fuels pollute the atmosphere or require power consuming and complicated mechanism to reduce the objectionable products of combustion released to the atmosphere. Steam power plants tend to be large, heavy, and complex. Available steam plants also depend upon petroleum fuels as their primary heat source, and therefore are subject to the same polluting disadvantages as the internal combustion power plants.

It is desirable therefore to provide a small, light weight, high speed power unit of simple design and construction that employs nonpetroleum fuels, and which has products of combustion which do not pollute the atmosphere.

SUMMARY OF THE INVENTION

The invention relates to a high pressure internal combustion steam power plant capable of both fixed and stationary applications. A frame attaches the power unit to its mounting and supports the components of the power unit. A combustion chamber rotates with an output power shaft which is formed integrally with the forward end of the combustion chamber. The power shaft rotates in a single bearing. Gaseous oxyen and hydrogen, and water in a liquid state are sequentially introduced into the combustion chamber by means of a stationary nozzle, supported in the frame, and which projects into the after end of the combustion chamber. The nozzle is cylindrically shaped and has multiple concentric internal passages for the introduction of the fuels and water into the combustion chamber. The nozzle also contains a provision for igniting and sustaining the combustion of gaseous fuels. Heat deflectors positioned within the interior of the combustion chamber provide for thermal protection against high flame temperatures within the combustion chamber and direct the steam produced to propulsion pods located on the periphery of the combustion chamber. Steam exhausts through reaction nozzles in the propulsion pods to cause the combustion chamber and output shaft to rotate supplying output power or torque.

The primary object of the invention is to provide a new and improved high pressure internal combustion steam power unit. The design is simple in construction and light in weight. The fuel employed does not require consumption of increasingly scarce petroleum products. Exhaust emmission of the power unit is essentially water in the form of steam which does not pollute the atmosphere. These together with other objects and advantages will become apparent in considering the details of construction and operation of the power unit as they are more fully described. Reference will be made to the accompanying drawings in which like numerals refer to like parts throughout and in which:

FIG. 4 is a sectional view taken on line 4—4 of FIG. 3.

FIG. 5 is a sectional view taken on line 5—5 of FIG. 3.

FIG. 6 is an enlarged sectional view taken on line 6—6 of FIG. 4.

DETAILED DESCRIPTION OF THE DRAWINGS

Figure 1:
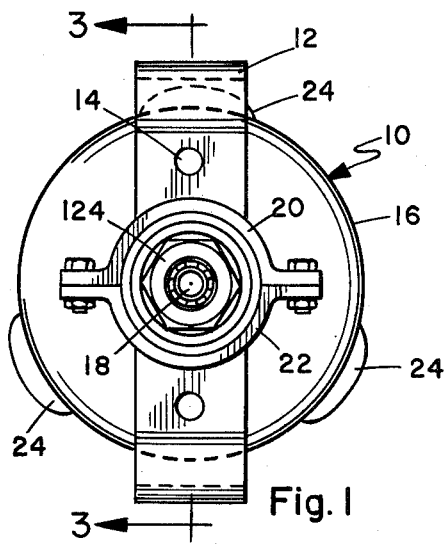
FIG. 1 is a front view showing the power output end of the power unit.

The drive end of power unit 10 is illustrated in FIG. 1. Mounting frame 12 is attachable to the power unit foundation by use of the mounting holes 14. Combustion chamber 16 has an integrally attached output shaft 18 which is supported in frame 12 by means of the upper and lower bearing caps 20 and 22, which are welded to frame 12. Three propulsion pods 24 are positioned around the periphery of combustion chamber 16.

Figure 2:
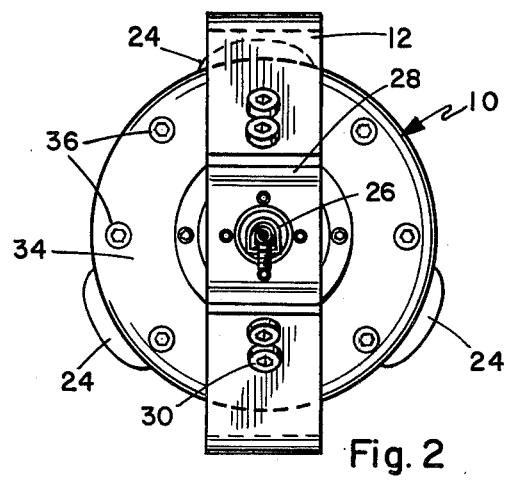
FIG. 2 is a rear view of the power unit showing the fuel nozzle mounting and arrangement.

The opposite, or fuel injection end, of power unit 10 is illustrated in FIG. 2. Injector nozzle 26 is shown centered in injector nozzle support frame 28 which is attached to frame 12 by mounting bolts 30.

Figure 3:
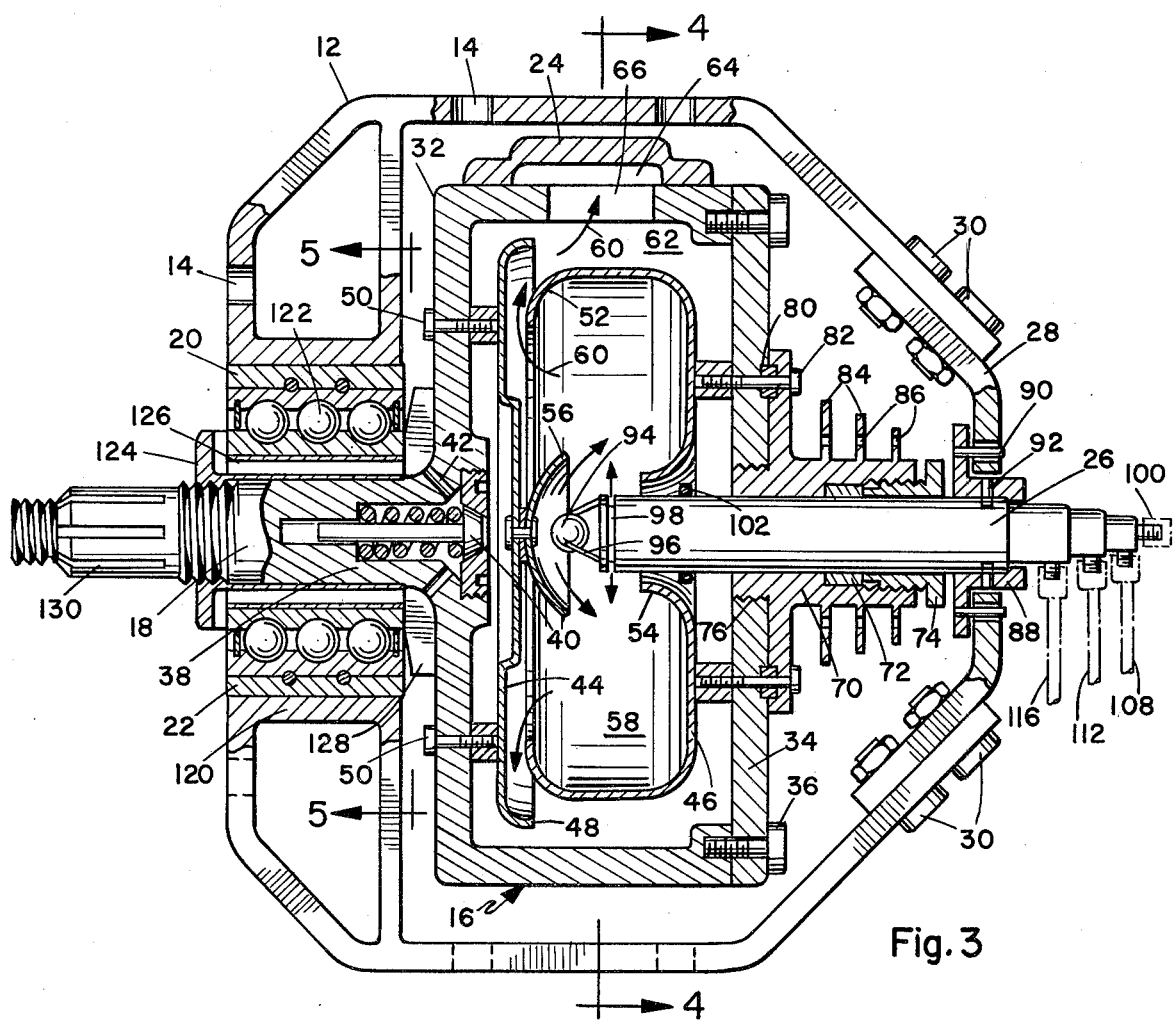
FIG. 3 is an enlarged sectional view taken on line 3—3 of FIG. 1.

Further details of the construction and arrangement of the power unit 10 are shown in FIG. 3. Combustion chamber 16 consists of a cupped shaped housing 32, the open end of which is closed by cover plate 34. Output shaft 18 is formed integrally with combustion chamber housing 32 and extends from the forward end of the combustion chamber 16. Within hub 38 of drive shaft 18 is located a safety relief valve 40 which controls the passages 42 from the interior of combustion chamber 16 to the atmosphere. Should the pressure within the combustion chamber exceed safe limits, relief valve 40 opens to vent the interior of the combustion chamber to the atmosphere.

To protect combustion chamber 16 from high internal temperatures and control the flow of combustion products and steam within chamber 16, forward heat deflector 44 and after heat deflector 46 manufactured of titanium are provided. Forward heat deflector 44 is circular in shape with a concave rim 48. The foward heat deflector 44 is mounted to the base of combustion chamber housing 32 and spaced therefrom by mounting bolts 50. The after heat deflector 46 is mounted to the interior of combustion chamber cover plate 34. Deflector 46 is an annular element whose end section 52 overlaps the rim 48 of the forward heat deflector 44. The core portion 54 of after heat deflector 46 surrounds and shields the combustion chamber entry section 47 of injector nozzle 26. Located in the center of the forward heat deflector 44 is a concave flame deflector 56. The arrangement of the deflectors 44, 46, and 56 is such as to define passages for combustion products within combustion chamber 16. Oxygen and hydrogen are burned and water is emitted into combustion space 58. Steam flows as indicated by arrows 60 between forward heat deflector 44 and after heat deflector 46 to the annular space 62.

Propulsion pods 24 are mounted on the exterior periphery of combustion chamber 16. Pods 24 have a hollow interior space 64 which is in flow communication with the interior annular space 62 of combustion chamber 16 via flow ports 66 as shown in FIG. 3 and FIG. 4. Propulsion pods 24 are provided with exhaust nozzle slots 68 from which steam is emitted to the atmosphere causing rotation of combustion chamber 16.

The details of the construction and mounting of injector nozzle 26 are illustrated in FIGS. 3 and 6. Injector nozzle 26 is mounted in nozzle seal housing 70 with high pressure seal 72 and gland nut 74. Nozzle seal housing 70 is threaded into the centered opening in 76 in combustion chamber cover plate 34 and sealed thereto to metal discs 80 and bolts 82. Nozzle seal housing 70 is equipped with cooling fins 84 having air cooling passages 86 contained therein to achieve greater air flow. The after end of nozzle 26 is supported in nozzle support frame 28 by nozzle thrust retainer 88. Retainer 88 is provided with axial anti-rotation pins 90 and radial anti-rotation pins 92. Hot plut 94 is mounted at the combustion chamber end of nozzle 26 by means of support frame 96. Water is injected into the combustion chamber through the annular groove 98 adjacent to the base of support frame 96.

The inlet end of nozzle 26 is shown in the right hand portion of FIG. 3 and in the cut away drawing of FIG. 6. Thermocouple connection 100 permits sensing of thermocouple 102 located within combustion chamber 16. Igniter rod 104 extends the length of nozzle 26 and provides for electrical ignition of the fuel within the combustion chamber 16. Insulator 106 electrically isolates igniter rod 104. Connection 108 represents the hydrogen gas inlet and connects with passage 110 within nozzle 26. Water is admitted at connection 116 which is in flow communication with passage 118 within nozzle 26.

Mounting frame 12 of power plant 10 is provided with a bearing support section 120 at its forward end. Upper bearing cap 20 and lower bearing cap 22 are welded to support section 120 of mounting frame 12. Bearing 122 is supported between the bearing caps and accepts both radial and axial thrust of the rotating combustion chamber 16 and output shaft 18. Air cooling bushing 124 is secured to rotating shaft 18 and positioned between bearing 122 and shaft 18. As illustrated in FIGS. 3 and 5, bushing 124 contains air passages 126 and cooling fins 128 to distribute cooling air about the bearing and the forward exterior end of the combustion chamber 16.

Output shaft 18 terminates in spline section 130 which is connected to the load.

OPERATION

To start the power unit, controlled quantities of gaseous hydrogen and oxygen are introduced through nozzle 26 into the interior of combustion chambers 16. The oxygen and hydrogen are ignited electrically by a spark at the tip of ignitor rod 104. Their combustion produces a hot flame and creates high pressure within combustion chamber 16. The flame is directed by flame deflector 56 toward hot plug 94 and the center of combustion chamber 16. The resultant temperature of hot plug 94 precludes need for further spark to sustain combustion.

To permit control of the high temperature gases, they are reflected by flame deflector 56 toward the space between heat deflectors 44 and 46. Water is then introduced into the combustion chamber 16 via inlet groove 98 to reduce the approximately two thousand degree centigrade temperature of the combustion flame and producing high pressure steam. Steam fills combustion chamber 16 and flows through passages 66 into propulsion pods 24. The flow of high pressure steam from the nozzle slots 68 of the propulsion pods produce a reaction force which causes the combustion chamber 16 to rotate at the speed of approximately ten thousand revolutions per minute. The rotational speed of the power unit depends upon the load and the power available. Steam temperature is maintained at approximately five hundred and fifty degrees centigrade as sensed by thermocouple 102, by varying the volume of water spray. Power output is varied by varying the volume of the fuel gases to maintain a two thousand degree centigrade flame temperature. At high power settings, steam pressure exceeds four hundred atmospheres with the discharge speed of the steam through nozzle slots 68 approximately fifteen hundred meters per second. Should the pressure inside combustion chamber 16 exceed 450 atmospheres, the safety relief valve 40 will open, venting the excess pressure from the interior of combustion chamber 16. The power plant is shut down by shutting off the supply of fuel gases and the water supply.

having described my invention, I claim:

1. An internal combustion steam power unit, comprising:

a mounting frame for supporting said power unit, a power output shaft rotatable mounted in the frame, a combustion chamber having its forward end formed integrally with the output shaft, the output shaft and combustion chamber being supported in the frame by a single bearing, a stationary cylindrical nozzle mountable on the frame and projecting into the after end of the combustion chamber, the nozzle having a plurality of concentric internal annular passages for separately transporting hydrogen, oxygen, and water into the interior of the combustion chamber, an ignitor rod extending the length of the nozzle with its first end terminating in the combustion chamber, a hot plug mounted adjacent to the combustion chamber end of the nozzle for maintaining ignition temperature within the combustion chamber, the combustion chamber having a main frame section closed at its forward end and open at its after end and having a plurality of openings in its side walls, a cover plate for closing the after end of the main frame section, a first heat deflector mountable on and spaced from the interior of the cover plate for containing and directing the flow of combustion products and steam, a second heat deflector mountable within the main frame section and spaced from the forward end thereof for directing the flow of steam from the first heat deflector to the openings in the side walls of the main frame section, a flame deflector mountable at the center of the second heat deflector for directing the combustion flame toward the hot plug and first heat deflector, a plurality of propulsion pods spaced around the outer periphery of the main frame section in flow communication with the openings in its side walls for causing rotation of the main frame section, means for sequentially injecting hydrogen, oxygen, and water through the nozzle internal passages into the interior of the combustion chamber, means for igniting the hydrogen and oxygen at the combustion chamber end of the ignitor rod to produce steam, means for controlling the power output of said power unit.

2. An internal combustion steam power unit, comprising:

a mounting frame for supporting said power unit,
a power output shaft rotatable mounted in the frame,
a combustion chamber having its forward end formed integrally with the output shaft,
the output shaft and combustion chamber being supported in the frame by a single bearing,
a stationary cylindrical nozzle mounted on the frame and projecting into the after end of the combustion chamber,
the nozzle having a plurality of concentric internal annular passages for separately transporting hydrogen, oxygen, and water into the interior of the combustion chamber,
an ignitor rod extending the length of the nozzle with its first end terminating in the combustion chamber,
a hot plug mounted adjacent to the combustion chamber end of the nozzle for maintaining ignition temperature within the combustion chamber,
the combustion chamber having a main frame section closed at its forward end and open at its after end and having a plurality of openings in its side walls,
a cover plate for closing the after end of the main frame section,
a first heat deflector mountable on and spaced from the interior of the cover plate for containing and directing the flow of combustion products and steam,
a second heat deflector mountable within the main frame section and spaced from the forward end thereof for directing the flow of steam from the first heat deflector to the openings in the side walls of the main frame section,
a flame deflector mountable at the center of the second heat deflector for directing the combustion flame towards the hot plug and the first heat deflector,
a plurality of propulsion pods spaced around the outer periphery of the main frame section in flow communication with the openings in its side walls for causing rotation of the main frame,
tangential slots in the propulsion pods to form nozzles for the release of steam to the atmosphere,
means for igniting the hydrogen and oxygen within the combustion chamber to produce steam,
means for controlling the power output of said power unit.

3. An internal combustion steam power unit, comprising:

a mounting frame for supporting said power unit,
a power output shaft rotatable mounted in the frame,
a cylindrical combustion chamber closed at its forward end and open at its after end attached to and rotatable with the power shaft,
the combustion chamber having a plurality of openings in its side walls,
a cover plate for closing the after end of the combustion chamber,
means for injecting hydrogen, oxygen, and water into the interior of the combustion chamber,
means for igniting and sustaining the combustion of hydrogen and oxygen within the combustion chamber to produce steam therein,
means for rotating the combustion chamber spaced around the outer periphery of the combustion chamber in corresponding relationship to, and in flow communication with the openings in its side walls,
a first heat deflector mountable on and spaced from the interior of the cover plate for containing and directing the flow of combustion products,
a second heat deflector mountable within the combustion chamber and spaced from the forward end thereof for directing the flow of combustion products from the first heat deflector towards the openings in the combustion chamber walls,
a flame deflector mountable on the second heat deflector for directing the combustion flame toward the combustion sustaining means, and
means for controlling the power output of said power unit.

4. An internal combustion steam power unit as recited in claim 3 wherein the means for injecting hydrogen, oxygen and water comprises:

a stationary nozzle mountable on the frame and projecting into the after end of the combustion chamber,
the nozzle having a plurality of concentric internal annular passages for separately transporting hydrogen, oxygen, and water into the interior of the combustion chamber between the first and second heat deflectors.

5. An internal combustion steam power unit as recited in claim 3 wherein the means for igniting and sustaining combustion of hydrogen and oxygen within the combustion chamber further comprises:

an ignitor rod extending the length of the nozzle with its first end terminating in the combustion chamber,
means for applying an electrical voltage to the second end of the rod,
a hot plug mountable adjacent to the combustion chamber end of the nozzle for maintaining the hydrogen and oxygen ignition temperature.

6. An internal combustion steam power unit as recited in claim 3 wherein the means for rotating the combustion chamber further comprises:

a plurality of propulsion pods spaced around the outer periphery of the combustion chamber to receive steam from the openings in the side walls of the combustion chamber, and
tangential slots in the propulsion pods forming nozzles for the release of steam to the atmosphere.

7. An internal combustion steam power unit as recited in claim 3 wherein:

the exhaust products are water vapor and steam.

8. An internal combustion steam power unit as recited in claim 3 wherein:

only hydrogen, oxygen, and water are injected into the combustion chamber during operation of said power unit.

* * * * *